Patented Apr. 28, 1942

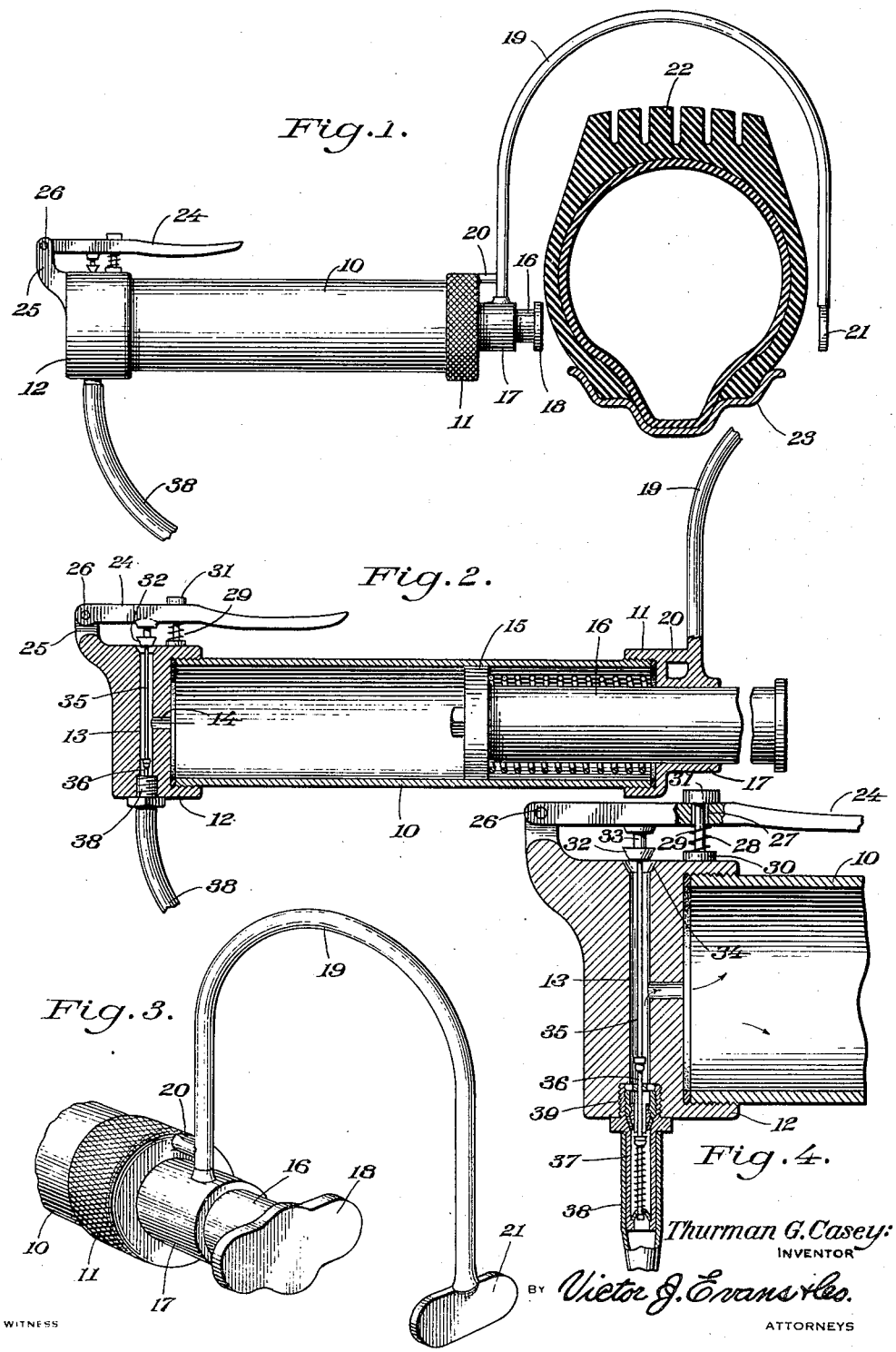

2,281,476

UNITED STATES PATENT OFFICE 2,281,476

TIRE COMPRESSOR

Thurman G. Casey, Oakland, Calif.

Application December 16, 1940, Serial No. 370,398

2 Claims. (Cl. 157—6)

This invention relates to a tire compressor and has for an object to provide a tool for eliminating a large amount of time and effort involved in removing tires from rims.

A further object is to provide a tool comprising essentially a pneumatic piston and cylinder, and a hook carried by the cylinder adapted to embrace the tire, the piston and free end of the hook co-acting in compressing the tire transversely near the beads to dislodge a tire easily and quickly from a rim.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a tire compressor constructed in accordance with the invention associated with a tire and rim, the latter two parts being shown in cross section.

Figure 2 is a longitudinal sectional view of the tool with parts removed and parts in elevation.

Figure 3 is a detail perspective view showing the enlarged ends of the plunger and the hook.

Figure 4 is a detail sectional view showing the air intake and exhaust valves of the air cylinder.

Referring now to the drawing in which like characters of reference designate similar parts in the various views, 10 designates an air cylinder provided at the front end with a flanged cap closure 11 and provided at the rear end with a flanged cap closure 12 which is considerably thickened to provide space for an air duct 13 which extends transversely of the cap and communicates with the cylinder through a duct 14 formed axially in the cap.

A piston 15 is disposed in the air cylinder and the piston rod 16 thereof projects through a guide tube 17 formed on the cap 11 and terminates in an enlarged head 18, best shown in Figure 3.

An arched hook 19 is rigidly secured at one end to the guide tube 17 and at this end is braced by a short rod 20 which is rigidly secured to the cap 11 and to the hook and extends parallel to the guide tube 17. The free end of the hook terminates in an enlarged plate like head 21 somewhat similar to the head 18 of the piston rod. The hook is of sufficient size to straddle a tire 22 which is to be removed from a rim 23, and dispose the enlarged head 21 in alinement with the enlarged head 18 of the piston rod and on the opposite side of the tire from the piston head.

A lever 24 is pivotally mounted at one end on a lug 25 which is formed integral with the thick cap 12, a pivot pin 26 being passed through the lug and end of the lever. The lever is provided with an opening 27, best shown in Figure 4, which receives a guide pin 28 which is secured to the cap 12. A helical spring 29 is sleeved on the pin between the lever and a head 30 formed on the pin at the secured end thereof. The spring normally tends to urge the lever outwardly against a head 31 on the outer end of the guide pin.

A conical valve 32 is formed on a valve stem 33, which is secured to the lever, and normally seats on a seat 34 formed in the adjacent end of the air duct 13. When the lever is in normal position the valve 32 is held open and permits air to exhaust from the air cylinder 10. When the lever is depressed, the valve is closed to seal the air duct 33 at the seat 34 and permit compressed air to enter the cylinder as will now be described.

A stem 35 is formed integral with the exhaust valve 32 and extends axially through the air duct 13. The stem 35 engages the stem 36 of a conventional tire valve 37 which is disposed in an air tube 38 and which is screw-threadedly engaged in an enlarged portion of the air duct as shown at 39. The air tube may be connected to any suitable source of supply.

In operation the enlarged head 21 of the hook 19 is engaged against the inside edge of the vehicle wheel and the piston rod head 18 is then engaged against the outside bead portion of the tire, and then air is let into the cylinder to move the piston toward the free end of the hook to detach the outside bead portion of the tire from the wheel flange 23. Then the enlarged head 18 of the piston is engaged with the outside flange of the wheel while the head of the hook 21 is engaged against the inside bead portion of the tire. Air is again let into the cylinder and the enlarged head 21 of the hook will co-act with the head 18 of the piston rod in compressing the tire transversely and thus detach the inside bead portion of the tire from the wheel flange 23.

From the above description it is thought that the construction and operation of the invention will be fully understood without further explanation.

What is claimed is:

1. A tool for removing tires from rims comprising, an air cylinder, means at the rear end of the cylinder for admitting air to the cylinder, a cap closing the front end of the cylinder provided with an axial opening, a piston in the cylinder having a piston rod projecting through said opening, a guide tube for the piston extending from said cap, an enlarged head on the free end of the piston rod, an arched member fixed at its rear end to said guide tube and adapted to straddle a tire, an enlarged head on the free end of the member located opposite the head of the piston rod, and brace means connected to the member and to the cap.

2. The structure as of claim 1 and in which said brace means comprises an arm connected to the arched member and to the cap and extending parallel to the guide tube.

THURMAN G. CASEY.